United States Patent
Kakimoto et al.

(10) Patent No.: US 12,030,559 B2
(45) Date of Patent: Jul. 9, 2024

(54) STEERING SYSTEM

(71) Applicants: JTEKT CORPORATION, Osaka (JP); TOYOTA JIDOSHA KABUSHIKI KAISHA, Toyota (JP)

(72) Inventors: Yusuke Kakimoto, Okazaki (JP); Yoshiyuki Uchino, Okazaki (JP); Kenji Shibata, Nagoya (JP); Takafumi Sato, Kariya (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 418 days.

(21) Appl. No.: 17/346,796

(22) Filed: Jun. 14, 2021

(65) Prior Publication Data

US 2021/0394820 A1 Dec. 23, 2021

(30) Foreign Application Priority Data

Jun. 18, 2020 (JP) ................................. 2020-105195

(51) Int. Cl.
*B62D 5/04* (2006.01)
*B62D 15/02* (2006.01)

(52) U.S. Cl.
CPC ......... *B62D 5/0463* (2013.01); *B62D 15/021* (2013.01)

(58) Field of Classification Search
None
See application file for complete search history.

(56) References Cited

U.S. PATENT DOCUMENTS

| | | | |
|---|---|---|---|
| 4,979,114 A | 12/1990 | Oshita et al. | |
| 5,881,836 A * | 3/1999 | Nishimoto | B62D 5/0466 180/446 |
| 2004/0138796 A1* | 7/2004 | Yao | B62D 5/006 180/443 |
| 2005/0205345 A1* | 9/2005 | Hayashi | B62D 15/0285 180/446 |
| 2006/0129294 A1 | 6/2006 | Moser et al. | |
| 2008/0281490 A1 | 11/2008 | Wittig | |

(Continued)

FOREIGN PATENT DOCUMENTS

| | | |
|---|---|---|
| JP | H01-293273 A | 11/1989 |
| JP | H10-236329 A | 9/1998 |

(Continued)

OTHER PUBLICATIONS

Nov. 15, 2021 Extended European Search Report issued in European Patent Application No. 21179419.3.

(Continued)

*Primary Examiner* — Jaime Figueroa
*Assistant Examiner* — Jerrod Irvin Davis
(74) *Attorney, Agent, or Firm* — Oliff PLC (57) ABSTRACT

A steering system includes a steering shaft that rotates along with an operation of a steering wheel; a motor configured to generate a torque that is applied to the steering shaft; and a control unit configured to control the motor. The control unit is configured to control the motor such that a rotation speed of the steering wheel decreases gradually to zero when automatic rotation of the steering wheel is stopped, in a case where the steering wheel is automatically rotated as an adjustment process of adjusting a rotational position of the steering wheel.

5 Claims, 7 Drawing Sheets

(56) References Cited

U.S. PATENT DOCUMENTS

2017/0137056 A1* 5/2017 Aoki .................. B62D 15/0225
2018/0065659 A1* 3/2018 Aoki .................... B62D 5/0466

FOREIGN PATENT DOCUMENTS

| JP | 2006-321434 A | 11/2006 |
| JP | 2006-347209 A | 12/2006 |
| WO | 2019/052651 A1 | 3/2019 |

OTHER PUBLICATIONS

Aug. 29, 2023 Office Action issued in Japanese Patent Application No. 2020-105195.

* cited by examiner

STEERING SYSTEM

CROSS-REFERENCE TO RELATED APPLICATION

This application claims priority to Japanese Patent Application No. 2020-105195 filed on Jun. 18, 2020, incorporated herein by reference in its entirety.

BACKGROUND

1. Technical Field

The disclosure relates to a steering system of a vehicle.

2. Description of Related Art

There has been a so-called steer-by-wire steering system in which transmission of power between a steering wheel and turning wheels is cut off. The steering system includes a reaction mechanism including a reaction motor that is a source of a steering reaction force that is applied to a steering shaft and a turning mechanism including a turning motor that is a source of a turning force for turning the turning wheels. When a vehicle is traveling, a control device for the steering system generates a steering reaction force through power supply control for the reaction motor and turns the turning wheels through power supply control for the turning motor.

In such a steer-by-wire steering system, the steering wheel is not restricted by the turning mechanism. Accordingly, when a certain external force is applied to the steering wheel in a state in which the vehicle is powered off, there is a likelihood that the steering wheel may rotate. At this time, since the turning wheels do not operate, a positional relationship between the steering wheel and the turning wheels may be different from an original positional relationship corresponding to a predetermined steering angle ratio. Here, the steering angle ratio means a ratio between a turning angle of the turning wheels and a steering angle of the steering wheel.

Therefore, for example, in a steering system disclosed in Japanese Unexamined Patent Application Publication No. 2006-321434 (JP 2006-321434 A), a process of correcting a rotational position of a steering wheel is performed when a vehicle is powered on. A control device for the steering system stores the rotational position of the steering wheel when the vehicle has been powered off. The control device calculates a displacement in the rotational position of the steering wheel by comparing the rotational position of the steering wheel when the vehicle was powered off and the rotational position of the steering wheel when the vehicle has been powered on, and drives a reaction motor such that the displacement becomes 0 (zero).

SUMMARY

With the steering system disclosed in JP 2006-321434 A, a displacement in the positional relationship between the steering wheel and the turning wheels is reliably improved. Here, the steering wheel rotates automatically at a time at which the vehicle is powered on in order to correct the positional relationship between the steering wheel and the turning wheels. A driver may have a feeling of discomfort due to the automatic rotation of the steering wheel.

The disclosure provides a steering system that can decrease a driver's feeling of discomfort due to automatic rotation of a steering wheel.

According to an aspect of the disclosure, there is provided a steering system including a steering shaft that rotates along with an operation of a steering wheel; a motor configured to generate a torque that is applied to the steering shaft; and a control unit configured to control the motor. The control unit is configured to control the motor such that a rotation speed of the steering wheel decreases gradually to zero when automatic rotation of the steering wheel is stopped, in a case where the steering wheel is automatically rotated as an adjustment process of adjusting a rotational position of the steering wheel.

With this configuration, when the automatic rotation of the steering wheel is stopped, the rotation speed of the steering wheel decreases gradually. Since sudden stopping of the steering wheel that has been rotating is curbed, it is possible to decrease a driver's feeling of discomfort.

In the steering system according to the aspect, the control unit may be configured to control the motor such that the rotation speed of the steering wheel increases gradually when the automatic rotation of the steering wheel is started, in the case where the steering wheel is automatically rotated as the adjustment process.

With this configuration, when the automatic rotation of the steering wheel is started, the rotation speed of the steering wheel increases gradually. That is, the steering wheel starts rotating more smoothly. Since sudden rotation of the steering wheel is curbed, it is possible to decrease a driver's feeling of discomfort.

In the steering system according to the aspect, the control unit may be configured to perform steering angle feedback control for causing a steering angle that is a rotation angle of the steering wheel to reach a target steering angle that is set based on a point of view of adjustment of the rotational position of the steering wheel. In this case, the control unit may be configured to gradually change the rotation speed of the steering wheel by gradually changing a value of the target steering angle to a final target steering angle that is set based on the point of view of the adjustment while limiting the value of the target steering angle, when the automatic rotation of the steering wheel is started and when the automatic rotation of the steering wheel is stopped.

With this configuration, by gradually changing the value of the target steering angle to the final target steering angle that is set based on the point of view of the adjustment of the rotational position of the steering wheel while limiting the value of the target steering angle that is a target value of the steering angle, it is possible to gradually increase or decrease the rotation speed of the steering wheel.

In the steering system according to the aspect, the adjustment process may be a process of causing the rotational position of the steering wheel to correspond to a turning position of turning wheels of a vehicle when a power supply of the vehicle is switched from an off state to an on state.

With this configuration, when the process of causing the rotational position of the steering wheel to correspond to the turning position of the turning wheels is performed, it is possible to decrease a driver's feeling of discomfort due to the automatic rotation of the steering wheel.

The steering system according to the aspect may further include a stopper mechanism configured to restrict rotation of the steering wheel. In this case, the control unit may be configured to cause the steering wheel to perform a rotating operation to a first operation end and then cause the steering wheel to perform a reverse rotating operation to a second operation end by controlling the motor, and to calculate a neutral position of the steering wheel based on rotation angles of the motor at a start time point and an end time point of the reverse rotating operation of the steering wheel, as the adjustment process.

With this configuration, when the neutral position of the steering wheel is calculated, it is possible to decrease a driver's feeling of discomfort due to the automatic rotation of the steering wheel. In the steering system according to the aspect, transmission of power between the steering shaft and turning wheels of a vehicle may be cut off. In this case, the motor may be configured to generate a steering reaction force that is applied to the steering shaft and that is the torque in a direction opposite to a steering direction.

With this configuration, the steering system according to the aspect is suitable for a so-called steer-by-wire steering system.

With the steering system according to the aspect of the disclosure, it is possible to decrease a driver's feeling of discomfort due to automatic rotation of a steering wheel.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

A portion (a) in FIG. 5 is a front view illustrating a rotational position of a steering wheel before being corrected according to the first embodiment, portions (b), (c), and (d) in FIG. 5 are front views illustrating changes of the rotational position of the steering wheel under correction according to the first embodiment, and a portion (e) in FIG. 5 is a front view illustrating the rotational position of the steering wheel after being corrected according to the first embodiment.

A portion (a) in FIG. 6 is a graph illustrating a time-based change of a steering angle due to execution of a process of correcting the rotational position of the steering wheel according to the first embodiment and a portion (b) in FIG. 6 is a graph illustrating a time-based change of a steering angular velocity due to execution of the process of correcting the rotational position of the steering wheel according to the first embodiment.

A portion (a) in FIG. 8 is a graph illustrating a time-based change of a steering angular velocity due to execution of a process of setting a steering angle midpoint according to the second embodiment and a portion (b) in FIG. 8 is a graph illustrating a time-based change of a steering angle due to execution of the process of setting a steering angle midpoint according to the second embodiment.

DETAILED DESCRIPTION OF EMBODIMENTS

First Embodiment

Figure 1:
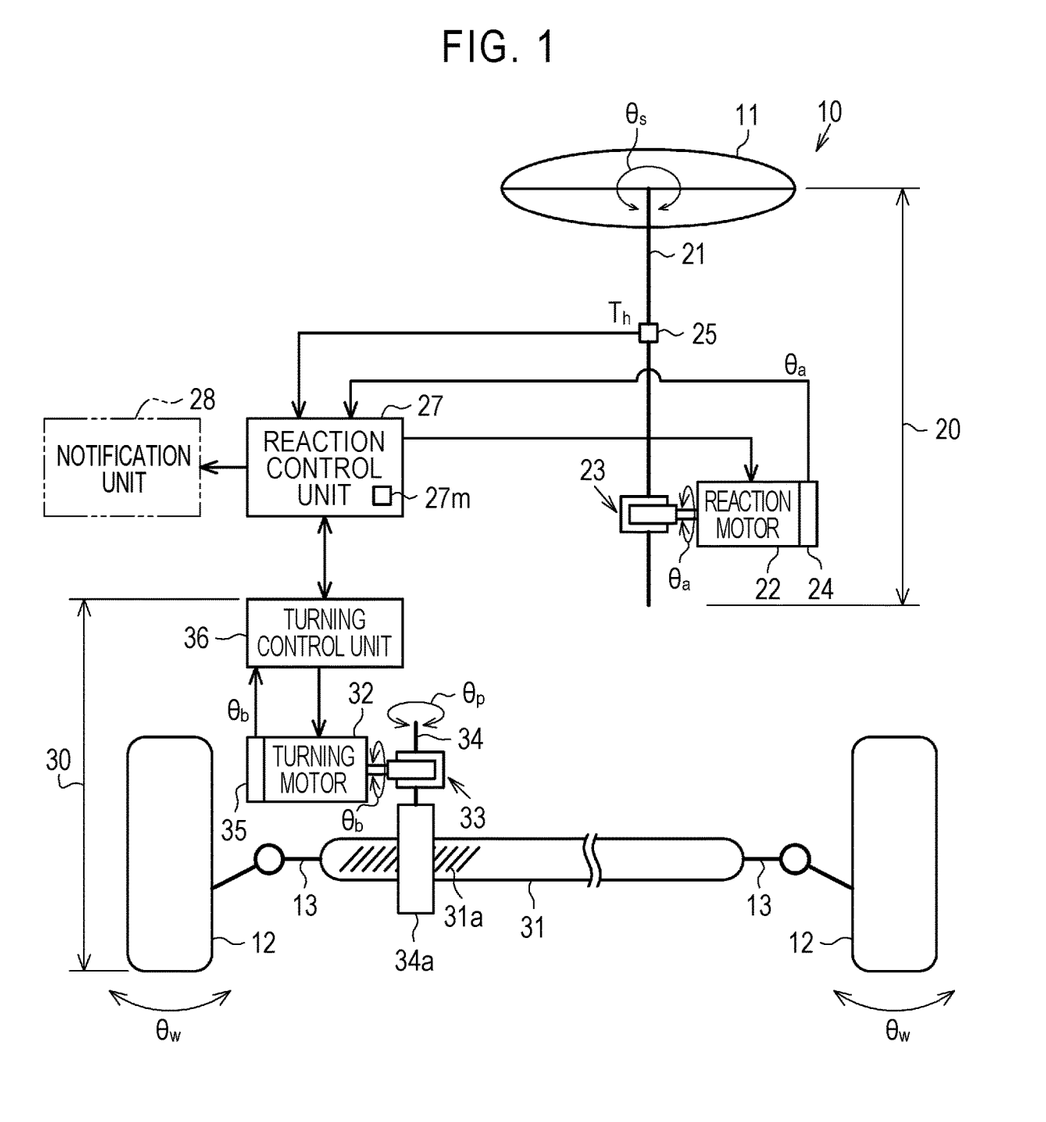
FIG. 1 is a diagram illustrating a configuration of a steering system according to a first embodiment.

Hereinafter, a steering system according to a first embodiment of the disclosure will be described. As illustrated in FIG. 1, a steering system 10 of a vehicle includes a reaction unit 20 that applies a steering reaction force to a steering wheel 11 of the vehicle and a turning unit 30 that turns turning wheels 12 of the vehicle. The steering reaction force represents a torque that is applied in a direction opposite to an operating direction of the steering wheel 11 that is operated by a driver. By applying the steering reaction force to the steering wheel 11, an appropriate feeling of reaction can be given to the driver.

The reaction unit 20 includes a steering shaft 21 to which the steering wheel 11 is connected, a reaction motor 22, a speed reduction mechanism 23, a rotation angle sensor 24, a torque sensor 25, and a reaction control unit 27.

The reaction motor 22 is a source from which a steering reaction force is generated. For example, a three-phase brushless motor is employed as the reaction motor 22. The reaction motor 22 is connected to the steering shaft 21 via the speed reduction mechanism 23. A torque that is generated by the reaction motor 22 is applied as a steering reaction force to the steering shaft 21.

The rotation angle sensor 24 is provided in the reaction motor 22. The rotation angle sensor 24 detects a rotation angle $\theta_a$ of the reaction motor 22. The torque sensor 25 is provided in a part between the speed reduction mechanism 23 and the steering wheel 11 in the steering shaft 21. The torque sensor 25 detects a steering torque $T_h$ that is applied to the steering shaft 21 through an operation of rotating the steering wheel 11.

The reaction control unit 27 calculates a steering angle $\theta_s$ that is a rotation angle of the steering shaft 21 based on the rotation angle $\theta_a$ of the reaction motor 22 detected by the rotation angle sensor 24. The reaction control unit 27 counts the number of rotations with respect to the rotation angle $\theta_a$ of the reaction motor 22 corresponding to a neutral steering position of the steering wheel 11 (hereinafter, the rotation angle $\theta_a$ corresponding to the neutral steering position will be referred to as a "motor midpoint"). The reaction control unit 27 calculates a total angle that is an angle obtained by totaling the rotation angle $\theta_a$ using the motor midpoint as an origin, and calculates the steering angle $\theta_s$ of the steering wheel 11 by multiplying the calculated total angle by a conversion factor based on a speed reduction ratio of the speed reduction mechanism 23. The motor midpoint is stored as steering angle midpoint information in the reaction control unit 27.

The reaction control unit 27 performs reaction control for generating a steering reaction force corresponding to the steering torque $T_h$ through drive control for the reaction motor 22. The reaction control unit 27 calculates a target steering reaction force based on the steering torque $T_h$ detected by the torque sensor 25 and calculates a target steering angle of the steering wheel 11 based on the calculated target steering reaction force and the steering torque $T_h$. The reaction control unit 27 calculates a difference between the steering angle $\theta_s$ that is calculated based on the rotation angle $\theta_a$ of the reaction motor 22 and the target steering angle, and controls supply of electric power to the reaction motor 22 such that the difference is cancelled out. The reaction control unit 27 performs vector control for the reaction motor 22 using the rotation angle $\theta_a$ of the reaction motor 22 detected by the rotation angle sensor 24.

The turning unit 30 includes a turning shaft 31, a turning motor 32, a speed reduction mechanism 33, a pinion shaft 34, a rotation angle sensor 35, and a turning control unit 36. The turning shaft 31 extends in a vehicle width direction (the right-left direction in FIG. 1). Right and left turning wheels 12 are respectively connected to both ends of the turning shaft 31 via tie rods 13.

The turning motor 32 is a source from which a turning force is generated. For example, a three-phase brushless motor is employed as the turning motor 32. The turning motor 32 is connected to the pinion shaft 34 via the speed reduction mechanism 33. Pinion teeth 34a of the pinion shaft 34 engage with rack teeth 31a of the turning shaft 31. A torque that is generated by the turning motor 32 is applied as a turning force to the turning shaft 31 via the pinion shaft 34. The turning shaft 31 moves in the vehicle width direction (the right-left direction in FIG. 1) with rotation of the turning motor 32. A turning angle $\theta_w$ of the turning wheels 12 changes with the movement of the turning shaft 31.

The rotation angle sensor 35 is provided in the turning motor 32. The rotation angle sensor 35 detects a rotation angle $\theta_b$ of the turning motor 32. The turning control unit 36 performs turning control for turning the turning wheels 12 based on a steering state through drive control for the turning motor 32. The turning control unit 36 calculates a rotation angle $\theta_p$ of the pinion shaft 34 based on the rotation angle $\theta_b$ of the turning motor 32 detected by the rotation angle sensor 35. The turning control unit 36 calculates a target rotation angle of the pinion shaft 34 based on the target steering angle calculated by the reaction control unit 27. Here, the target rotation angle of the pinion shaft 34 is calculated based on the viewpoint of realizing a predetermined steering angle ratio. The turning control unit 36 calculates a difference between the target rotation angle of the pinion shaft 34 and an actual rotation angle $\theta_p$ and controls supply of electric power to the turning motor 32 such that the difference is cancelled out. The turning control unit 36 performs vector control for the turning motor 32 using the rotation angle $\theta_b$ of the turning motor 32 detected by the rotation angle sensor 35.

Figure 2:
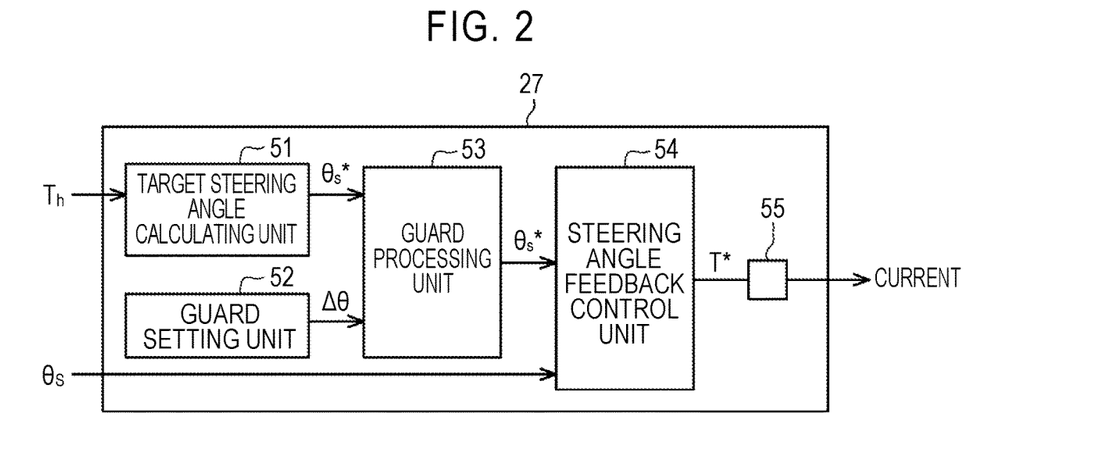
FIG. 2 is a block diagram illustrating a reaction control unit according to the first embodiment.

A part of a functional configuration of the reaction control unit 27 will be described below in detail. As illustrated in FIG. 2, the reaction control unit 27 includes a target steering angle calculating unit 51, a guard setting unit 52, a guard processing unit 53, a steering angle feedback control unit 54, and a power supply control unit 55.

The target steering angle calculating unit 51 calculates a target steering torque based on a steering torque $T_h$ detected by the torque sensor 25 and calculates a target steering reaction force through feedback control for the steering torque $T_h$ such that the steering torque $T_h$ reaches the calculated target steering torque. The target steering angle calculating unit 51 calculates a target steering angle $\theta_s^*$ of the steering wheel 11 based on the calculated target steering reaction force and the steering torque $T_h$. The target steering angle calculating unit 51 calculates the target steering angle $\theta_s^*$, for example, based on an ideal model in which the steering angle $\theta_s$ of the steering wheel 11 corresponding to an ideal turning angle based on an input torque is modeled in advance by experiment or simulation when the sum of the target steering reaction force and the steering torque $T_h$ is used as the input torque.

The guard setting unit 52 sets a limit value $\Delta\theta$ for limiting a change amount of the target steering angle $\theta_s^*$ in predetermined operation cycle(s). The guard processing unit 53 limits the change amount of the target steering angle $\theta_s^*$ calculated by the target steering angle calculating unit 51 based on the limit value $\Delta\theta$ set by the guard setting unit 52.

A so-called time-based change limiting function of limiting the change amount of the target steering angle $\theta_s^*$ in predetermined operation cycle(s) to the predetermined limit value $\Delta\theta$ is realized by the guard setting unit 52 and the guard processing unit 53.

The steering angle feedback control unit 54 receives the target steering angle $\theta_s^*$ processed by the guard processing unit 53 and the steering angle $\theta_s$ calculated based on the rotation angle $\theta_a$ of the reaction motor 22. The steering angle feedback control unit 54 calculates a target steering reaction force T* through feedback control for the steering angle $\theta_s$ such that the steering angle $\theta_s$ calculated based on the rotation angle $\theta_a$ of the reaction motor 22 reaches the target steering angle $\theta_s^*$.

The power supply control unit 55 supplies electric power corresponding to the target steering reaction force T* to the reaction motor 22. Specifically, the power supply control unit 55 calculates a current command value for the reaction motor 22 based on the target steering reaction force T*. The power supply control unit 55 calculates a difference between the current command value and an actual current value detected by a sensor that is not illustrated, and controls supply of electric power to the reaction motor 22 such that the difference is cancelled out. Accordingly, the reaction motor 22 generates a torque corresponding to the target steering reaction force T*.

In the steer-by-wire steering system 10, since the steering wheel 11 is not restricted by the turning unit 30, there is a likelihood that the following event will occur.

That is, when the vehicle is powered on, the steering wheel 11 and the turning wheels 12 are synchronized with each other. Accordingly, a positional relationship between the steering wheel 11 and the turning wheels 12 is maintained at a positional relationship based on a predetermined steering angle ratio. When a certain external force is applied to the steering wheel 11 in a state in which the vehicle is powered off, the steering wheel 11 may rotate. At this time, since the turning shaft 31 does not operate, the positional relationship between the steering wheel 11 and the turning wheels 12 may become different from an original positional relationship based on the predetermined steering angle ratio.

Accordingly, the steering system 10 has a function of automatically adjusting a rotational position of the steering wheel 11 as an initial operation when the vehicle is powered on again. For example, when the steering wheel 11 rotates by a predetermined angle in the counterclockwise direction (a positive direction) in a period in which the vehicle is powered off, the steering wheel 11 is rotated by the predetermined angle in the clockwise direction (a negative direction) through drive control for the reaction motor 22 when the vehicle is powered on again. Accordingly, the positional relationship between the steering wheel 11 and the turning wheels 12 returns to the original positional relationship based on the predetermined steering angle ratio.

As illustrated in FIG. 1, the reaction control unit 27 includes a storage unit 27m. When a power supply of the vehicle is switched from ON to OFF (i.e., from an on state to an off state), the reaction control unit 27 stores the steering angle $\theta_s$ calculated immediately before as a reference steering angle $\theta_0$ in the storage unit 27m. The reference steering angle $\theta_0$ serves as a reference for determining whether the steering wheel 11 has rotated in a period in which the vehicle was powered off.

When the power supply of the vehicle is switched from OFF to ON (i.e., from the off state to the on state), the reaction control unit 27 determines whether position adjustment of the steering wheel 11 is necessary by comparing the reference steering angle $\theta_0$ stored in the storage unit 27m with the steering angle $\theta_s$ calculated immediately after the vehicle has been powered on.

When the reference steering angle $\theta_0$ that is the steering angle $\theta_s$ immediately before the vehicle is powered off and the steering angle $\theta_s$ immediately after the vehicle is powered on again match each other, the reaction control unit 27 determines that position adjustment of the steering wheel 11 is not necessary. Since the steering angle $\theta_s$ does not change in a period until the vehicle is powered on again after the vehicle has been powered off, it is apparent that the steering wheel 11 has not rotated. The reaction control unit 27 starts normal reaction control for generating a steering reaction force based on the steering torque $T_h$.

When the reference steering angle $\theta_0$ that is the steering angle $\theta_s$ immediately before the vehicle is powered off and the steering angle $\theta_s$ immediately after the vehicle is powered on again do not match each other, the reaction control unit 27 determines that position adjustment of the steering wheel 11 is necessary, and performs position adjustment of the steering wheel 11. For example, the reaction control unit 27 calculates a difference between the reference steering angle $\theta_0$ and the steering angle $\theta_s$ immediately after the vehicle has been powered on and performs supply of electric power to the reaction motor 22 such that the difference is cancelled out. Specifically, the reaction control unit 27 calculates the target steering angle $\theta_s^*$ based on the difference between the reference steering angle $\theta_0$ and the steering angle $\theta_s$ immediately after the vehicle has been powered on, and performs feedback control for the steering angle $\theta_s$ such that the steering angle $\theta_s$ reaches the calculated target steering angle $\theta_s^*$. When the reference steering angle $\theta_0$ and the present steering angle $\theta_s$ match each other, position adjustment of the steering wheel 11 is completed.

However, a driver who is not aware that such an initial operation is being performed may have a feeling of discomfort due to the automatic rotation of the steering wheel 11. Therefore, in this embodiment, the rotation speed of the steering wheel 11 in a period from start of execution of the initial operation to end of execution of the initial operation is changed based on the viewpoint of decreasing the driver's feeling of discomfort due to the automatic rotation of the steering wheel 11. The reaction control unit 27 changes the rotation speed of the steering wheel 11 by changing the limit value $\Delta\theta$ of the target steering angle $\theta_s^*$.

Figure 3:
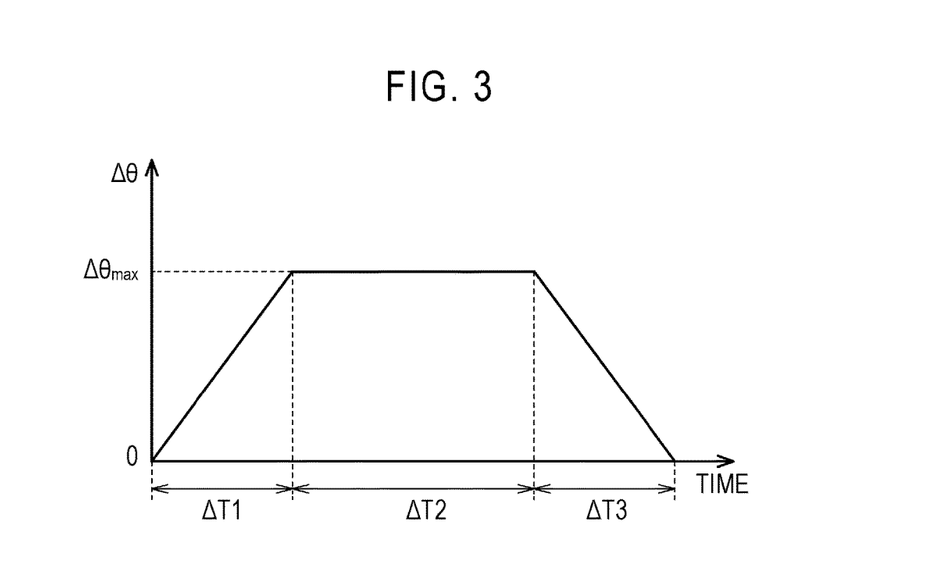
FIG. 3 is a graph illustrating a time-based change of a change limiting width that is set by the reaction control unit according to the first embodiment.

As illustrated in the graph of FIG. 3, the reaction control unit 27 gradually increases the limit value $\Delta\theta$ from "0" to a maximum limit value $\Delta\theta_{max}$ in a first period $\Delta T1$ until a difference between the absolute value of the initial value (=steering angle $\theta_s$) of the target steering angle $\theta_s^*$ and the absolute value of the present value of the target steering angle $\theta_s^*$ reaches a first difference threshold value from start of execution of the initial operation. The maximum limit value $\Delta\theta_{max}$ is a maximum permissible value of a change of the target steering angle $\theta_s^*$ in predetermined operation cycle(s) (i.e., per predetermined operation cycle(s)).

The reaction control unit 27 maintains the limit value $\Delta\theta$ at the maximum limit value $\Delta\theta_{max}$ in a second period $\Delta T2$ until the difference between the absolute value of the final target steering angle $\theta_s^*$ and the absolute value of the present value of the target steering angle $\theta_s^*$ reaches a value less than a second difference threshold value after the difference between the absolute value of the initial value of the target steering angle $\theta_s^*$ and the absolute value of the present value of the target steering angle $\theta_s^*$ has reached the first difference threshold value.

The reaction control unit 27 gradually decreases the limit value $\Delta\theta$ from the maximum limit value $\Delta\theta_{max}$ to "0" in a third period $\Delta T3$ until the difference between the absolute value of the final target steering angle $\theta_s^*$ and the absolute value of the present value of the target steering angle $\theta_s^*$ reaches "0" after the difference between the absolute value of the final target steering angle $\theta_s^*$ and the absolute value of the present value of the target steering angle $\theta_s^*$ has reached a value less than the second difference threshold value.

Figure 4:
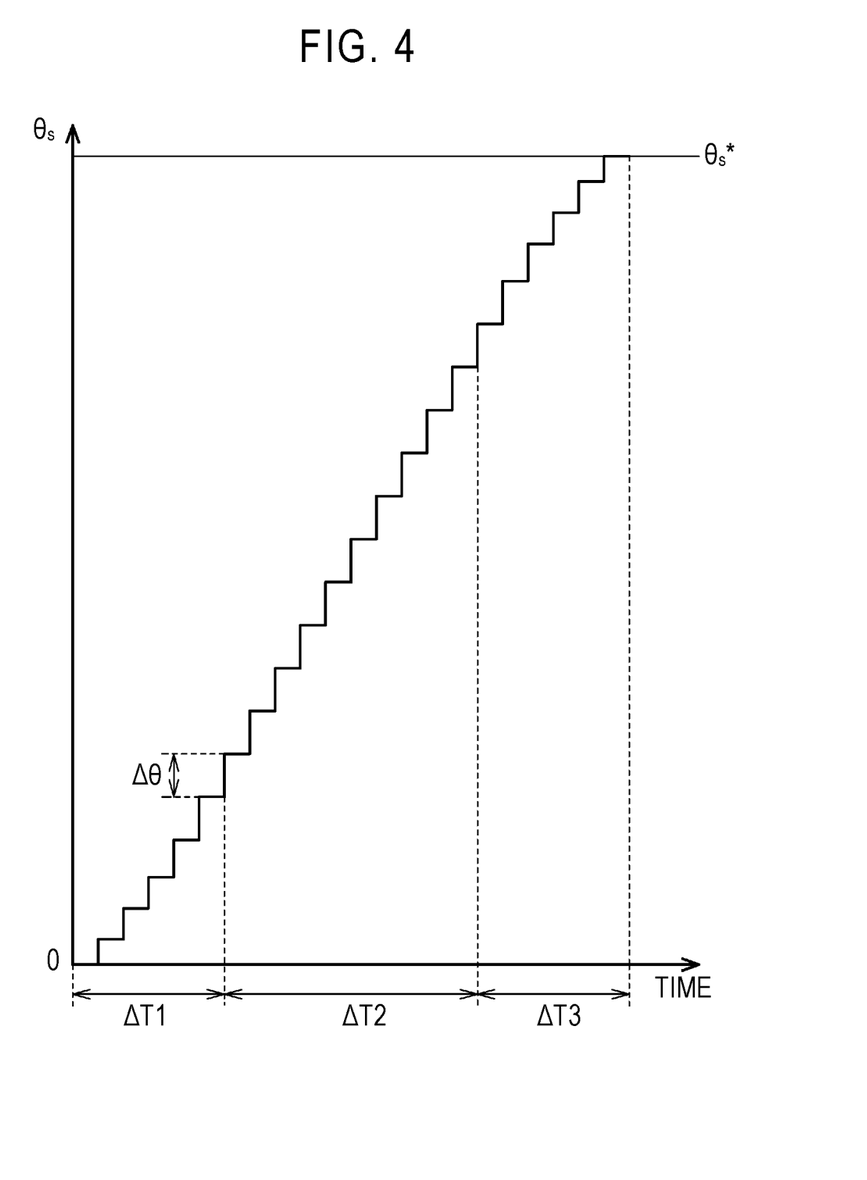
FIG. 4 is a graph illustrating a time-based change of a steering angle according to the first embodiment.

As illustrated in the graph of FIG. 4, in a period until the value of the steering angle $\theta_s$ reaches the final target steering angle $\theta_s^*$, the change amount of the steering angle $\theta_s$ per predetermined operation cycle(s) becomes greater as the limit value $\Delta\theta$ becomes greater. On the other hand, the change amount of the steering angle $\theta_s$ per predetermined operation cycle(s) becomes less as the limit value $\Delta\theta$ becomes less. When the limit value $\Delta\theta$ is constant, the change amount of the steering angle $\theta_s$ per predetermined operation cycle(s) is a constant value corresponding to the limit value $\Delta\theta$.

The operation of the steering wheel 11 in the course of performing the initial operation of the steering system 10 will be described below. As illustrated in the portion (a) in FIG. 5, as the premise state, the steering wheel 11 rotates by an angle $-\alpha$ in the clockwise direction with respect to the turning position of the turning wheels 12 in a state in which the power supply of the vehicle is switched from ON to OFF. The positional relationship between the steering wheel 11 and the turning wheels 12 is kept different from an original positional relationship corresponding to a predetermined steering angle ratio. Here, the turning wheels 12 are located at a neutral turning position (turning angle $\theta_w=0°$) corresponding to straight ahead movement of the vehicle. Accordingly, the steering wheel 11 needs to be inherently located at a neutral steering position (steering angle $\theta_s=0°$) corresponding to straight ahead movement of the vehicle.

Figure 5:
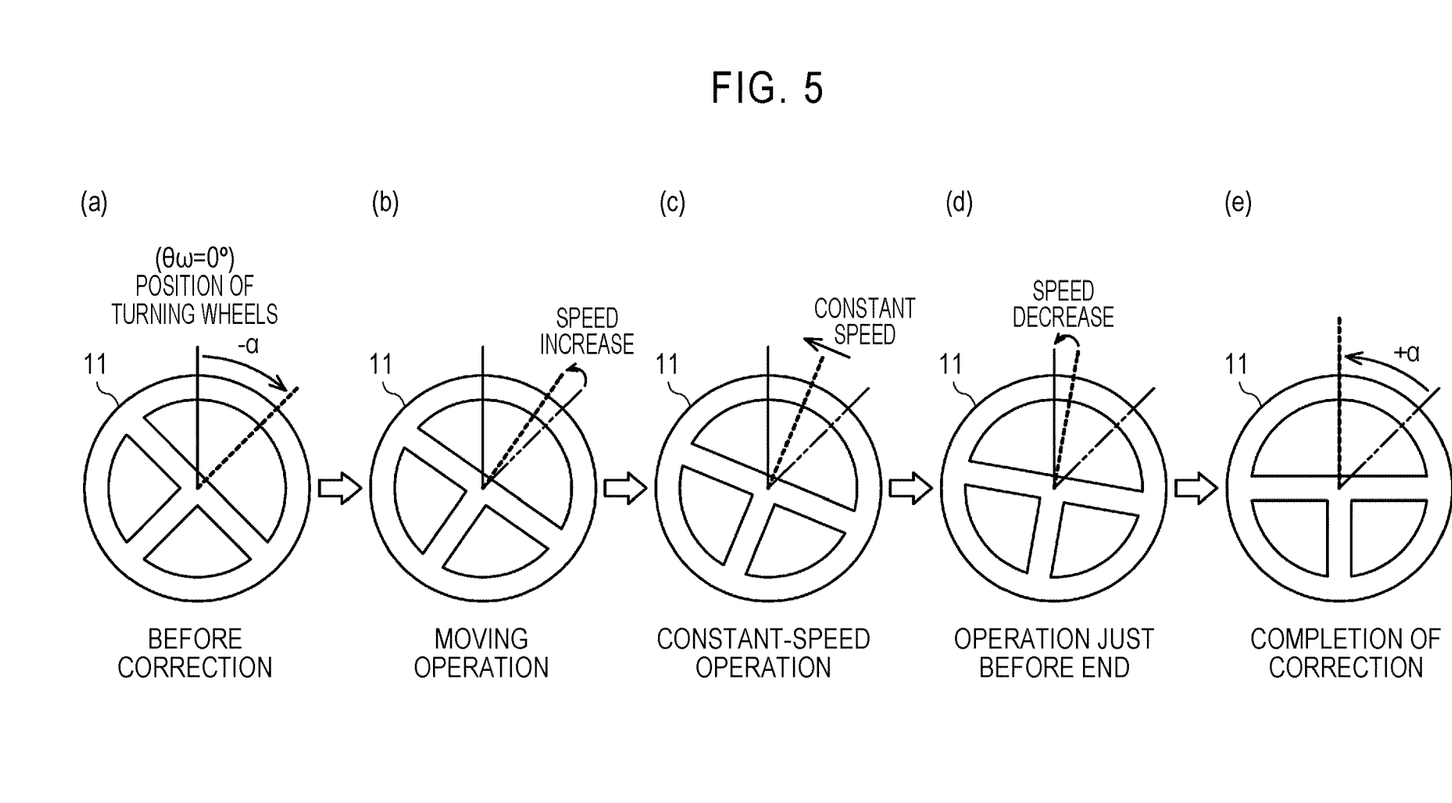

When the power supply of the vehicle is switched from OFF to ON, the reaction control unit 27 starts position adjustment of the steering wheel 11. The summary of a series of operations of the steering wheel 11 at this time is as follows.

As illustrated in the portion (b) in FIG. 5, the steering wheel 11 starts rotating in the counterclockwise direction (the positive direction) and the rotation speed of the steering wheel 11 increases gradually. As illustrated in the portion (c) in FIG. 5, the rotation speed of the steering wheel 11 reaches a constant speed. As illustrated in the portion (d) in FIG. 5, as an amount of rotation of the steering wheel 11 approaches an angle $+\alpha$ in the counterclockwise direction, the rotation speed of the steering wheel 11 decreases gradually. As illustrated in the portion (e) in FIG. 5, when the amount of rotation of the steering wheel 11 reaches the angle $+\alpha$ in the counterclockwise direction, the position adjustment of the steering wheel 11 is completed. By causing the steering wheel 11 to rotate by the angle $+\alpha$ in the counterclockwise direction with respect to the initial position that is reached by rotating by an angle $-\alpha$ in the clockwise direction with respect to the turning position of the turning wheels 12, the positional relationship between the steering wheel 11 and the turning wheels 12 returns to the original positional relationship corresponding to the predetermined steering angle ratio.

Time-based changes of a steering angular velocity $\omega$ and a steering angle $\theta_s$ from start to end of the position adjustment of the steering wheel 11 will be described below in detail. Here, a premise state is the same as illustrated in the portion (a) in FIG. 5. The steering angular velocity ω is synonymous with the rotation speed of the steering wheel 11.

Figure 6:
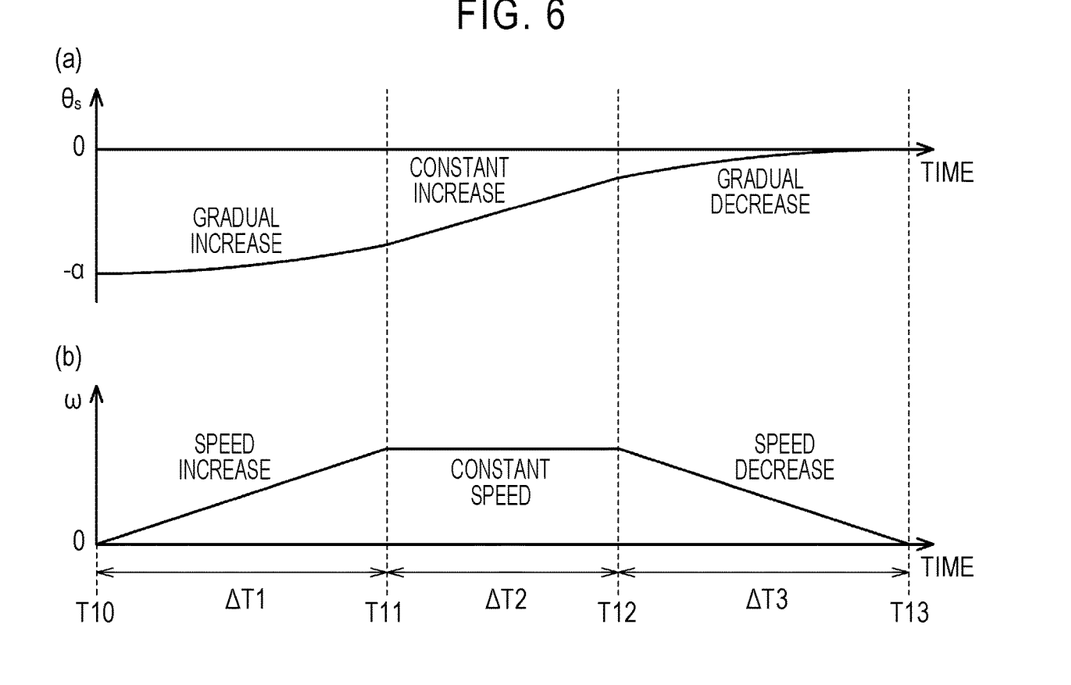

As illustrated in the graph of the portion (b) in FIG. 6, at the time of start of the position adjustment of the steering wheel 11 (time T10), the steering wheel 11 starts rotating in the counterclockwise direction (the positive direction) and the steering angular velocity ω of the steering wheel 11 starts increasing gradually. This is because the limit value Δθ, that is, the absolute value of the target steering angle $θ_s*$, increases gradually toward the final target steering angle $θ_s*$ ($θ_s*=0°$ herein). As illustrated in the graph of the portion (a) in FIG. 6, the absolute value of the steering angle $θ_s$ decreases gradually toward "0°" that is an original steering angle $θ_s$ corresponding to the neutral steering position. Here, the slope that is a change amount of the steering angle $θ_s$ per unit time increases gradually. In this way, since the steering wheel 11 moves more smoothly, it is possible to decrease a driver's feeling of discomfort.

As illustrated in the graph of the portion (b) in FIG. 6, the steering angular velocity ω of the steering wheel 11 reaches a constant speed (time T11). This is because the limit value Δθ, that is, the absolute value of the target steering angle $θ_s*$, is maintained at a constant value. As illustrated in the graph of the portion (a) in FIG. 6, the absolute value of the steering angle $θ_s$ decreases gradually toward "0°" that is the original steering angle $θ_s$ corresponding to the neutral steering position. Here, the slope that is a change amount of the steering angle $θ_s$ per unit time is maintained at a constant slope.

As illustrated in the portions (a) and (b) in FIG. 6, after the absolute value of the steering angle $θ_s$ has reached a value close to "0°" that is the original steering angle $θ_s$ corresponding to the neutral steering position (time T12), the steering angular velocity ω of the steering wheel 11 decreases gradually. This is because the limit value Δθ, that is, the absolute value of the target steering angle $θ_s*$, decreases gradually toward the final target steering angle $θ_s*$. As illustrated in the graph of the portion (a) in FIG. 6, the absolute value of the steering angle $θ_s$ decreases gradually to "0°" that is the original steering angle $θ_s$ corresponding to the neutral steering position. Here, the slope that is a change of the steering angle $θ_s$ per unit time decreases gradually.

As illustrated in the portions (a) and (b) in FIG. 6, when the absolute value of the steering angle $θ_s$ of the steering wheel 11 reaches "0°" that is the original steering angle $θ_s$ corresponding to the neutral steering position (time T13), the operation of the steering wheel 11 stops. The steering angular velocity ω of the steering wheel 11 becomes "0." As illustrated in the graph of the portion (a) in FIG. 6, the absolute value of the steering angle $θ_s$ matches the final target steering angle $θ_3*$ ($θ_3*=θ_w=0°$ herein). That is, the positional relationship between the steering wheel 11 and the turning wheels 12 returns to the original positional relationship corresponding to the predetermined steering angle ratio. Since the rotation speed of the steering wheel 11 decreases gradually immediately before the position adjustment of the steering wheel 11 has been completed, it is possible to decrease a driver's feeling of discomfort.

Advantages of First Embodiment

Accordingly, according to the first embodiment, the following advantages can be achieved. (1) Immediately after the position adjustment of the steering wheel 11 has been started, the rotation speed of the steering wheel increases gradually. That is, the steering wheel 11 starts rotating more smoothly. Since sudden rotation of the steering wheel 11 is curbed, it is possible to decrease a driver's feeling of discomfort.

(2) Immediately before the position adjustment of the steering wheel 11 has been ended, the rotation speed of the steering wheel decreases gradually. Since sudden stopping of the steering wheel 11 that has been rotating is curbed, it is possible to decrease a driver's feeling of discomfort.

(3) By the function of gradually increasing and decreasing the rotation speed of the steering wheel 11 that is described above in (1) and (2), it is possible to decrease a driver's feeling of discomfort immediately after the position adjustment of the steering wheel 11 has been started and immediately before the position adjustment of the steering wheel 11 has been ended. Accordingly, it is possible to rotate the steering wheel 11 at a higher speed in a period in which the rotation speed of the steering wheel 11 is maintained at a constant speed. Accordingly, it is possible to realize a smoother rotation behavior of the steering wheel 11 and to decrease a time required from start to end of the position adjustment of the steering wheel 11.

Second Embodiment

A steering system according to a second embodiment of the disclosure will be described below. This embodiment basically has the same configuration as the first embodiment illustrated in FIGS. 1 and 2. This embodiment may be embodied in combination with the first embodiment.

Figure 7:
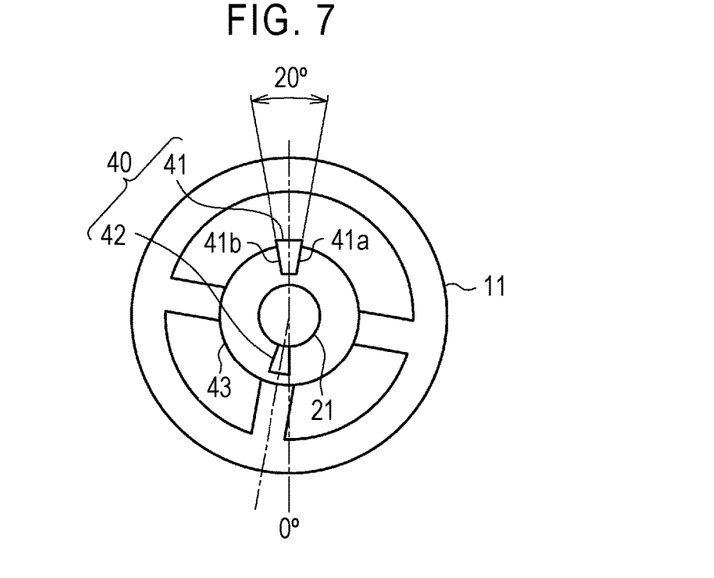
FIG. 7 is a rear view of a steering wheel according to a second embodiment.

As illustrated in FIG. 7, the reaction unit 20 includes a stopper mechanism 40. The stopper mechanism 40 is provided to limit the steering angle $θ_s$ of the steering wheel 11. The stopper mechanism 40 restricts rotation of the steering wheel 11 over one turn (360°). FIG. 7 is a rearview of the steering wheel 11.

The stopper mechanism 40 includes a first restriction member 41 and a second restriction member 42. The first restriction member 41 is fixed to a steering column 43 that supports the steering shaft 21 at the vehicle body. The first restriction member 41 extends in a radial direction of the steering shaft 21. The first restriction member 41 includes a first restriction surface 41a and a second restriction surface 41b that are located on opposite sides in the rotating direction of the steering shaft 21. The first restriction surface 41a and the second restriction surface 41b are inclined such that the restriction surfaces approach each other toward the steering shaft 21 in the radial direction of the steering shaft 21. The first restriction member 41 is provided to correspond to the neutral position of the steering wheel 11.

The second restriction member 42 is fixed to an outer peripheral surface of the steering shaft 21. The second restriction member 42 is located in the vicinity of an end of the steering shaft 21 on the side of the steering wheel 11. The second restriction member 42 extends in a direction perpendicular to a rotation center axis of the steering shaft 21. The second restriction member 42 is configured to come into contact with the first restriction member 41 in the rotating direction of the steering shaft 21. Accordingly, the steering wheel 11 moves between a first restriction position at which the second restriction member 42 is in contact with the first restriction surface 41a of the first restriction member 41 and a second restriction position at which the second restriction member 42 is in contact with the second restriction surface 41b of the first restriction member 41.

When an angle that is formed by the first restriction surface 41a and the second restriction surface 41b is set to, for example, 20°, the second restriction member 42 comes into contact with the first restriction surface 41a of the first restriction member 41 at a time at which the steering wheel 11 rotates rightward by 170° with respect to the neutral position of the steering wheel 11. The second restriction member 42 comes into contact with the second restriction surface 41b of the first restriction member 41 at a time at which the steering wheel 11 rotates leftward by 170° with respect to the neutral position of the steering wheel 11. That is, an operating range of the steering wheel 11 is limited to a range of ±170° with respect to the neutral position of the steering wheel 11, that is, a total range of 340°.

The positional relationship between the steering wheel 11 and the turning wheels 12 is maintained at a positional relationship corresponding to a predetermined steering angle ratio. For example, when the steering wheel 11 is operated in the entire operating range thereof, the turning wheels 12 are turned in the entire turning range thereof. Here, since the operating range of the steering wheel 11 is limited to a range less than 360°, it is possible to turn the turning wheels 12 in the entire turning range without rotating the steering wheel 11 by one turn. That is, it is not necessary to perform a hand switching operation (hand-over-hand operation) on the steering wheel 11.

In the steering system 10, the turning motor 32 is controlled based on the steering angle $\theta_s$ of the steering wheel 11. The steering system 10 includes the stopper mechanism 40 that is provided to limit the steering angle $\theta_s$ of the steering wheel 11. Accordingly, in order to maintain the positional relationship between the steering wheel 11 and the turning wheels 12 at the positional relationship corresponding to a predetermined steering angle ratio, the neutral steering position of the steering wheel 11 and a neutral turning position of the turning wheels 12 need to be matched.

For example, when a battery is detached from the vehicle in replacement work of the battery, electric power is not supplied to the reaction control unit 27. Accordingly, the steering angle midpoint information stored in the reaction control unit 27 is lost. Accordingly, it may be difficult to maintain the positional relationship between the steering wheel 11 and the turning wheels 12 at the positional relationship corresponding to the predetermined steering angle ratio. Therefore, the reaction control unit 27 sets the steering angle midpoint information again when the vehicle is first power on after a new battery has been attached to the vehicle.

The reaction control unit 27 first calculates a present steering angle $\theta_s$ as an initial position of the steering wheel 11 based on the rotation angle $\theta_a$ of the reaction motor 22 at a time point at which the vehicle has been powered on, and temporarily stores the calculated steering angle $\theta_3$.

Then, the reaction control unit 27 sets a first target steering angle based on the steering angle $\theta_s$ stored as the initial position of the steering wheel 11 such that the steering wheel 11 rotates rightward to a position at which the second restriction member 42 comes into contact with the first restriction surface 41a of the first restriction member 41. The reaction control unit 27 temporarily stores, as a first end angle, the steering angle $\theta_s$ at a time when the second restriction member 42 comes into contact with the first restriction surface 41a of the first restriction member 41 by performing the steering angle feedback control.

Then, the reaction control unit 27 sets a second target steering angle based on the steering angle $\theta_s$ stored as the initial position of the steering wheel 11 such that the steering wheel 11 rotates leftward to a position at which the second restriction member 42 comes into contact with the second restriction surface 41b of the first restriction member 41. The reaction control unit 27 temporarily stores, as a second end angle, the steering angle $\theta_s$ at a time when the second restriction member 42 comes into contact with the second restriction surface 41b of the first restriction member 41 by performing the steering angle feedback control.

Then, the reaction control unit 27 calculates a value that is half the sum of the first end angle and the second end angle, as a midpoint $\theta_{s0}$ of the steering angle $\theta_s$. The calculated midpoint $\theta_{s0}$ of the steering angle $\theta_s$ corresponds to a motor midpoint that is the rotation angle $\theta_a$ of the reaction motor 22 at a time when the steering wheel 11 is located at the neutral steering position. The reaction control unit 27 stores the calculated midpoint $\theta_{s0}$ of the steering angle $\theta_s$ and the motor midpoint as the steering angle midpoint information. In this way, the process of setting a steering angle midpoint is completed.

Thereafter, the reaction control unit 27 sets, as a third target steering angle, a value of the midpoint $\theta_{s0}$ of the steering angle $\theta_s$ stored as the steering angle midpoint information such that the steering wheel 11 rotates to the position corresponding to the true midpoint $\theta_{s0}$ of the steering angle $\theta_3$. The reaction control unit 27 rotates the steering wheel 11 to the position at which the steering angle $\theta_s$ matches the third target steering angle by performing the steering angle feedback control. Accordingly, the rotational position of the steering wheel 11 reaches the position corresponding to the true midpoint $\theta_{s0}$ of the steering angle $\theta_s$.

In the case where the steering angle midpoint setting process is performed, the steering wheel rotates automatically at the time at which the power supply of the vehicle is turned on. A driver may have a feeling of discomfort due to the automatic rotation of the steering wheel. When the steering wheel 11 is rotated to the first restriction position with respect to the position at which the power supply of the vehicle has been turned on, when the steering wheel 11 is rotated reversely from the first restriction position to the second restriction position, and when the steering wheel 11 is rotated from the second restriction position to the midpoint $\theta_{s0}$ of the steering angle $\theta_s$, it may not be possible to achieve a smooth behavior of the steering wheel 11. For example, the steering wheel 11 may rotate suddenly or stop suddenly.

Therefore, in this embodiment, in the case where the steering angle midpoint setting process is performed, the rotation speed of the steering wheel 11 is gradually increased and decreased, in the same way as in the case in which the function of automatically adjusting the rotational position of the steering wheel 11 is performed in the first embodiment. That is, immediately after the automatic rotation of the steering wheel 11 has been started, the rotation speed of the steering wheel 11 is gradually increased. Immediately before the automatic rotation of the steering wheel 11 has been stopped, the rotation speed of the steering wheel 11 is gradually decreased.

Figure 8:
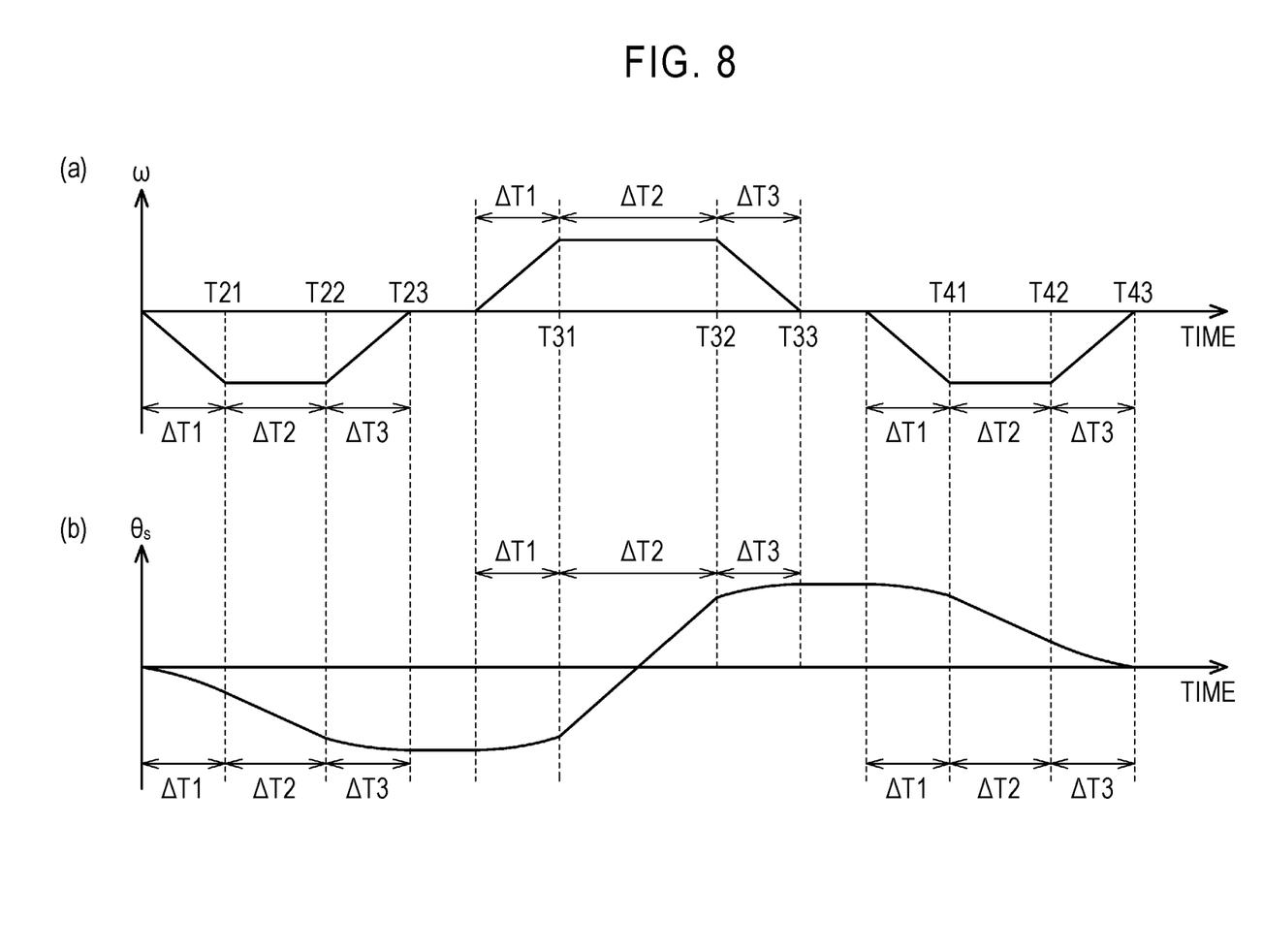

As illustrated in the graph of the portion (a) in FIG. 8, when the steering wheel 11 is rotated to the first restriction position with respect to the position at which the power supply of the vehicle is turned on, the steering angular velocity ω of the steering wheel 11 increases gradually and finally reaches a constant speed (time T21). After the rotational position of the steering wheel 11 has approached the first restriction position (time T22), the steering angular velocity ω of the steering wheel 11 decreases gradually. The rotation of the steering wheel 11 stops when the rotational position of the steering wheel 11 has reached the first restriction position (time T23).

When the steering wheel 11 is rotated reversely from the first restriction position to the second restriction position, the steering angular velocity ω of the steering wheel 11 increases gradually and finally reaches a constant speed (time T31). After the rotational position of the steering wheel 11 has approached the second restriction position (time T32), the steering angular velocity ω of the steering wheel 11 decreases gradually. The rotation of the steering wheel 11 stops when the rotational position of the steering wheel 11 has reached the second restriction position (time T33).

Finally, when the steering wheel 11 is rotated from the second restriction position to the midpoint $θ_{s0}$ of the steering angle $θ_s$, the steering angular velocity ω of the steering wheel 11 increases gradually and finally reaches a constant speed (time T41). After the rotational position of the steering wheel 11 has approached the midpoint $θ_{s0}$ of the steering angle $θ_s$ (time T42), the steering angular velocity ω of the steering wheel 11 decreases gradually. The rotation of the steering wheel 11 stops when the rotational position of the steering wheel 11 has reached the midpoint $θ_{s0}$ of the steering angle $θ_s$ (time T43).

As illustrated in the graph of the portion (b) in FIG. 8, the steering angle $θ_s$ can change more smoothly without increasing suddenly (sharply) or without decreasing suddenly (sharply) by changing the limit value Δθ for the target steering angle $θ_s$* depending on a steering situation.

Accordingly, according to the second embodiment, the following advantages can be achieved. (4) Immediately after the automatic rotation of the steering wheel 11 has been started, the rotation speed of the steering wheel increases gradually. That is, the steering wheel 11 starts rotating more smoothly. Since sudden rotation of the steering wheel 11 is curbed, it is possible to decrease a driver's feeling of discomfort.

(5) Immediately before the automatic rotation of the steering wheel 11 has been stopped, the rotation speed of the steering wheel decreases gradually. Since sudden stopping of the steering wheel 11 that has been rotating is curbed, it is possible to decrease a driver's feeling of discomfort.

(6) By the function of gradually increasing and decreasing the rotation speed of the steering wheel 11 that is described above in (4) and (5), it is possible to decrease a driver's feeling of discomfort immediately after the automatic rotation of the steering wheel 11 has been started and immediately before the automatic rotation of the steering wheel 11 has been ended. Accordingly, it is possible to rotate the steering wheel 11 at a higher speed in a period in which the rotation speed of the steering wheel 11 is maintained at a constant speed. Accordingly, it is possible to realize a more smooth rotation behavior of the steering wheel 11 and to decrease a time required from start to end of the steering angle midpoint setting process.

Third Embodiment

A steering system according to a third embodiment of the disclosure will be described below. This embodiment basically has the same configuration as that of the first embodiment illustrated in FIG. 1, and this embodiment is different from the first embodiment in the configuration of the reaction control unit 27. This embodiment may be embodied in combination with the second embodiment.

Figure 9:
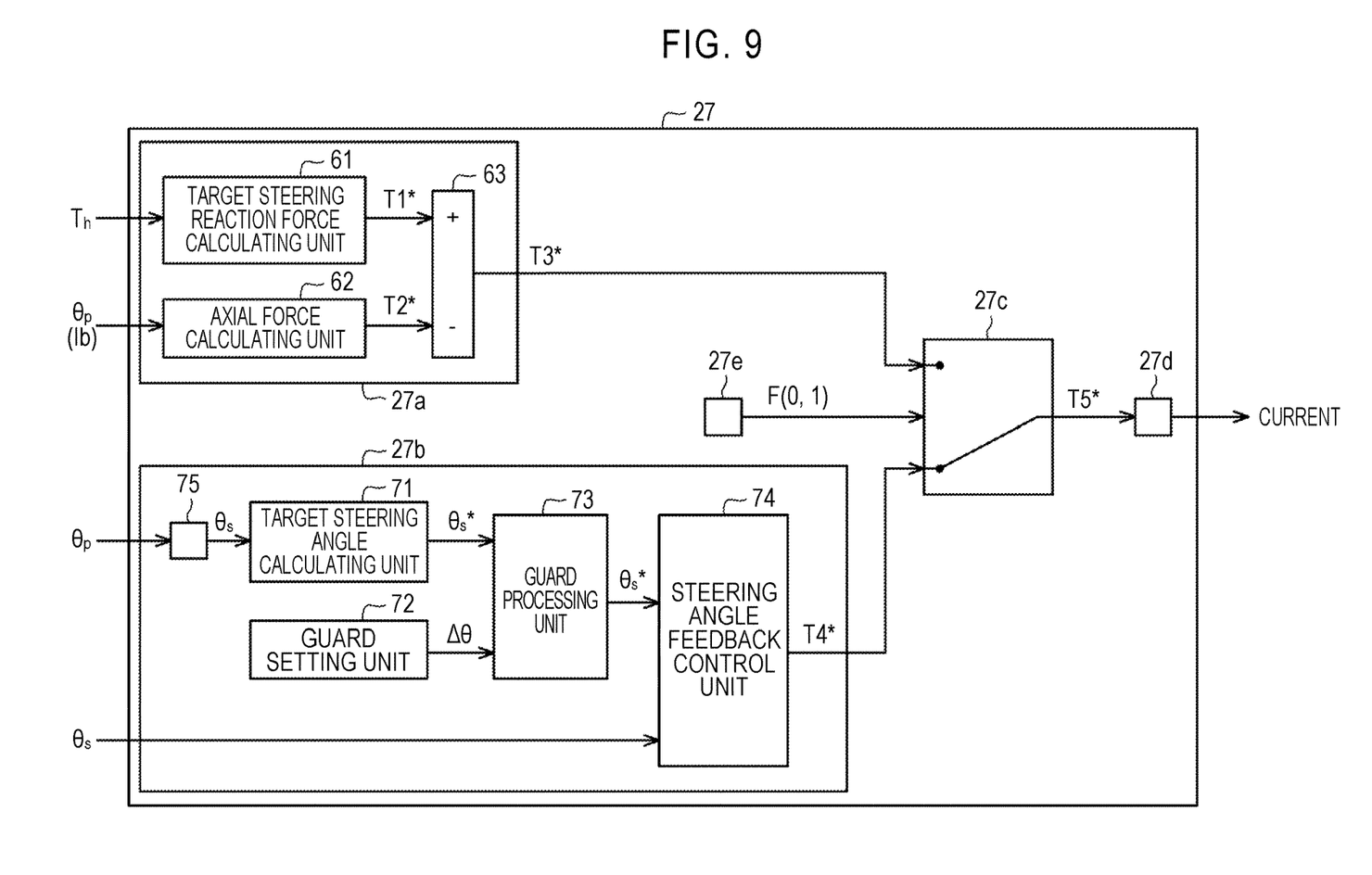
FIG. 9 is a block diagram illustrating a reaction control unit according to a third embodiment.

As illustrated in FIG. 9, the reaction control unit 27 includes a first control unit 27a, a second control unit 27b, a switch 27c, a power supply control unit 27d, and a flag setting circuit 27e. The first control unit 27a is a unit that performs normal reaction control for generating a steering reaction force corresponding to the steering torque $T_h$ through drive control of the reaction motor 22. The first control unit 27a includes a target steering reaction force calculating unit 61, an axial force calculating unit 62, and a subtractor 63.

The target steering reaction force calculating unit 61 calculates a target steering reaction force T1* based on the steering torque $T_h$. The target steering reaction force T1* is a target value of a steering reaction force that is to be generated from the reaction motor 22. The target steering reaction force calculating unit 61 calculates the target steering reaction force T1* of which the absolute value becomes larger as the absolute value of the steering torque $T_h$ become larger.

The axial force calculating unit 62 calculates an axial force that is applied to the turning shaft 31 via the turning wheels 12, for example, based on at least one of the value of the rotation angle $θ_p$ of the pinion shaft 34 and the value of a current $I_b$ of the turning motor 32 and calculates an equivalent torque value (that is, a steering reaction force based on the axial force) T2* obtained by converting the calculated axial force to a torque.

The subtractor 63 calculates a target steering reaction force T3* by subtracting the equivalent torque value T2* calculated by the axial force calculating unit 62 from the target steering reaction force T1* calculated by the target steering reaction force calculating unit 61.

The second control unit 27b is a unit that performs the process of adjusting the rotational position of the steering wheel 11. The process of adjusting the rotational position of the steering wheel 11 means the adjustment process of automatically adjusting the rotational position of the steering wheel 11 according to the first embodiment or the steering angle midpoint setting process according to the second embodiment. The second control unit 27b includes a target steering angle calculating unit 71, a guard setting unit 72, a guard processing unit 73, a steering angle feedback control unit 74, and a steering angle calculating unit 75.

The steering angle calculating unit 75 calculates the steering angle $θ_s$ corresponding to the rotation angle $θ_p$ of the pinion shaft 34 based on the rotation angle $θ_p$ of the pinion shaft 34 and the steering angle ratio. The target steering angle calculating unit 71, the guard setting unit 72, the guard processing unit 73, and the steering angle feedback control unit 74 basically have the same functions as those of the target steering angle calculating unit 51, the guard setting unit 52, the guard processing unit 53, and the steering angle feedback control unit 54 in the first embodiment illustrated in FIG. 2. The target steering angle calculating unit 71 calculates a target steering angle $θ_s$* based on the steering angle $θ_s$ calculated by the steering angle calculating unit 75. The steering angle feedback control unit 74 receives the target steering angle $θ_s$* that has been processed by the guard processing unit 73 and the steering angle $θ_s$ calculated based on the rotation angle $θ_a$ of the reaction motor 22, and calculates a target steering reaction force T4* through feedback control of the steering angle $θ_s$ such that the received steering angle $θ_s$ reaches the target steering angle $θ_s$*.

The switch 27c receives the target steering reaction force T3* calculated by the first control unit 27a and the target steering reaction force T4* calculated by the second control unit 27b as data inputs. The switch 27c receives a flag F that is set by the flag setting circuit 27e as a control input. When the vehicle is powered on, the flag setting circuit 27e sets the value of the flag F to "0" when position adjustment of the steering wheel 11 is necessary and the position adjustment has not been completed. When the vehicle is powered on, the flag setting circuit 27e sets the value of the flag F to "1" when position adjustment of the steering wheel 11 is necessary and the position adjustment has been completed or when position adjustment of the steering wheel 11 is not necessary.

The switch 27c selects, as a final target steering reaction force T5*, one of the target steering reaction force T3* calculated by the first control unit 27a and the target steering reaction force T4* calculated by the second control unit 27b, based on the value of the flag F. When the value of the flag F is "0," the switch 27c selects the target steering reaction force T4* calculated by the second control unit 27b, as the final target steering reaction force T5*. When the value of the flag F is "1," the switch 27c selects the target steering reaction force T3* calculated by the first control unit 27a, as the final target steering reaction force T5*.

The power supply control unit 27d supplies electric power corresponding to the final target steering reaction force T5* selected by the switch 27c to the reaction motor 22. Accordingly, according to the third embodiment, the following advantages can be achieved in addition to the advantages described in (1) to (3) of the first embodiment or (4) to (6) of the second embodiment.

(7) The normal reaction control that is performed by the first control unit 27a and control for adjusting the rotational position of the steering wheel 11 are selectively performed (i.e., control is switched between the normal reaction control and the control for adjusting the rotational position of the steering wheel 11) based on whether the process of adjusting the rotational position of the steering wheel 11 has been completed. Accordingly, it is possible to prevent the normal reaction control and the control for adjusting the rotational position of the steering wheel 11 from interfering with each other.

OTHER EMBODIMENTS

The first to third embodiments may be modified as follows. In the second embodiment, the steering angle midpoint setting process is performed when the power supply of the vehicle is first turned on after a battery has been replaced, but, for example, the steering angle midpoint setting process may also be performed when the power supply of the vehicle is turned on regardless of whether replacement work of a battery has been performed.

In the second embodiment, a midpoint $\theta_{s0}$ of the steering angle $\theta_s$ corresponding to the neutral position of the steering wheel 11 is used as a reference point of the operation of the reaction unit 20, but a steering angle $\theta_s$ corresponding to a position departing from the neutral position of the steering wheel 11 may be used as the reference point of the operation of the reaction unit 20 as long as it can be correlated with the turning angle $\theta_w$ of the turning wheels 12.

In the second embodiment, when the steering wheel 11 is rotated to the first restriction position with respect to the position at which the power supply of the vehicle has been turned on, it is not possible to determine an amount of rotation angle of the steering wheel 11 from the position at which the power supply of the vehicle has been turned on to the first restriction position and thus it may not be possible to appropriately perform gradual increase and decrease of the rotation speed of the steering wheel 11. In this case, the gradual increase and decrease of the rotation speed of the steering wheel 11 may not be performed only in a period in which the steering wheel 11 is rotated to the first restriction position with respect to the position at which the power supply of the vehicle has been turned on in the steering angle midpoint setting process, or the following process may be performed.

That is, before the steering angle midpoint setting process is performed, a rough apparent positional relationship between the steering wheel 11 and the turning wheels 12 is determined and the steering wheel 11 is set to the vicinity of the neutral position in advance. Then, the gradual increase and decrease of the rotation speed of the steering wheel 11 is performed on the assumption that the steering wheel 11 rotates by an angle at which the steering wheel 11 comes into contact with the first restriction surface 41a of the first restriction member 41 when the steering wheel 11 rotates rightward from the neutral position of the steering wheel 11, that is, on the assumption that the steering wheel 11 rotates by 170° in the rightward steering direction.

As indicated by an alternate long and two short dashes line in FIG. 1, in the first to third embodiments, for example, when a notification unit 28 is provided in a vehicle cabin, the reaction control unit 27 may notify a driver of start and end of the position adjustment of the steering wheel 11 and start and end of the steering angle midpoint setting process using the notification unit 28. Examples of a notification operation using the notification unit 28 include display of a message using text and emission of a message using voice. With this configuration, since a driver can recognize that the steering wheel 11 is automatically rotating and the steering wheel 11 that is automatically rotating stops automatically, it is possible to decrease the driver's feeling of discomfort.

In the first to third embodiments, the steering angle $\theta_s$ that is calculated based on the rotation angle $\theta_a$ of the reaction motor 22 is used, but a steering angle $\theta_s$ that is detected by a steering angle sensor may be used when a configuration including the steering angle sensor is employed as the steering system 10.

In the first to third embodiments, the steering angle ratio is set to an appropriate value depending on product specifications or the like. The steering angle ratio may be, for example, "$\theta_s:\theta_w=1:1$" or "$\theta_s:\theta_w=1:3$." For example, when the steering angle ratio is "$\theta_s:\theta_w=1:3$" and the steering angle $\theta_s$ is displaced by 10°, the turning angle $\theta_w$ is displaced by 30°. Accordingly, it is more preferable to correctly synchronize the steering angle $\theta_s$ and the turning angle $\theta_w$ with each other.

In the first to third embodiments, the rotation speed of the steering wheel 11 is gradually increased immediately after the automatic rotation of the steering wheel 11 has been started, but the rotation speed of the steering wheel 11 may not be gradually increased. That is, immediately after the automatic rotation of the steering wheel 11 has been started, the steering wheel 11 may be rotated by performing the steering angle feedback control.

In the first to third embodiments, the reaction control unit 27 and the turning control unit 36 may be configured as a single control unit. In the first to third embodiments, a power supply of a vehicle may include, for example, an accessory power supply (an ACC power supply) or an ignition power supply (an IG power supply).

In the first to third embodiments, the steering system 10 of a vehicle has a so-called linkless structure in which transmission of power between the steering shaft 21 and the turning wheels 12 is cut off, but may employ a structure in which transmission of power between the steering shaft 21 and the turning wheels 12 can be cut off by a clutch. When the clutch is disengaged, the transmission of power between the steering wheel 11 and the turning wheels 12 is cut off. When the clutch is engaged, power is transmitted between the steering wheel 11 and the turning wheels 12\.

The second embodiment may be applied to an electric power steering system in which the steering shaft 21 and the turning shaft 31 are connected, for example, via a rack and pinion mechanism. In this case, the reaction motor 22 serves as a source of an assist force that is a force for assisting with the operation of the steering wheel 11.

What is claimed is:

1. A steering system comprising:
   a steering shaft that rotates along with an operation of a steering wheel;
   a motor configured to generate a torque that is applied to the steering shaft; and
   a control unit configured to control the motor, wherein the control unit is configured to
   control the motor such that a rotation speed of the steering wheel decreases gradually to zero when automatic rotation of the steering wheel is stopped, in a case where the steering wheel is automatically rotated as an adjustment process of adjusting a rotational position of the steering wheel,
   control the motor such that the rotation speed of the steering wheel increases gradually when the automatic rotation of the steering wheel is started, in the case where the steering wheel is automatically rotated as the adjustment process,
   perform steering angle feedback control for causing a steering angle that is a rotation angle of the steering wheel to reach a target steering angle that is set based on a point of view of adjustment of the rotational position of the steering wheel, and
   gradually change the rotation speed of the steering wheel by gradually changing a value of the target steering angle to a final target steering angle that is set based on the point of view of the adjustment while limiting the value of the target steering angle, when the automatic rotation of the steering wheel is started and when the automatic rotation of the steering wheel is stopped.

2. The steering system according to claim 1, wherein the adjustment process is a process of causing the rotational position of the steering wheel to correspond to a turning position of turning wheels of a vehicle when a power supply of the vehicle is switched from an off state to an on state.

3. The steering system according to claim 1, further comprising
   a stopper mechanism configured to restrict rotation of the steering wheel,
   wherein the control unit is configured to cause the steering wheel to perform a rotating operation to a first operation end and then cause the steering wheel to perform a reverse rotating operation to a second operation end by controlling the motor, and to calculate a neutral position of the steering wheel based on rotation angles of the motor at a start time point and an end time point of the reverse rotating operation of the steering wheel, as the adjustment process.

4. The steering system according to claim 1, wherein:
   transmission of power between the steering shaft and turning wheels of a vehicle is cut off; and
   the motor is configured to generate a steering reaction force that is applied to the steering shaft and that is the torque in a direction opposite to a steering direction.

5. The steering system according to claim 1, wherein the control unit is configured to switch to normal reaction force control after the adjustment process is completed.

* * * * *